(12) United States Patent
Fischer

(10) Patent No.: US 8,883,658 B2
(45) Date of Patent: Nov. 11, 2014

(54) TRANSLUCENT COMPOSITE

(75) Inventor: Oliver Fischer, Gotzis (AT)

(73) Assignee: Litwork, GmbH, Altach (AT)

(*) Notice: Subject to any disclaimer, the term of this patent is extended or adjusted under 35 U.S.C. 154(b) by 546 days.

(21) Appl. No.: 12/324,640

(22) Filed: Nov. 26, 2008

(65) Prior Publication Data

US 2010/0130081 A1  May 27, 2010

(51) Int. Cl.
*B32B 21/10* (2006.01)
*B32B 5/26* (2006.01)
*B29C 70/54* (2006.01)
*B29C 70/08* (2006.01)
*D03D 1/00* (2006.01)
*B29C 70/88* (2006.01)
*B29C 70/30* (2006.01)
*B29C 70/58* (2006.01)
*B29C 47/60* (2006.01)
*B29C 47/62* (2006.01)
*B29L 31/00* (2006.01)
*B29K 105/00* (2006.01)
*B29C 47/00* (2006.01)
*B29K 105/16* (2006.01)
*B29L 11/00* (2006.01)
*B29C 67/00* (2006.01)

(52) U.S. Cl.
CPC ............... *D03D 1/00* (2013.01); *B29C 70/585* (2013.01); *B32B 5/26* (2013.01); *D10B 2401/20* (2013.01); *B29C 70/545* (2013.01); *D10B 2503/04* (2013.01); *B29C 47/60* (2013.01); *B29C 47/62* (2013.01); *B29L 2031/747* (2013.01); *B29C 70/088* (2013.01); *D03D 1/0088* (2013.01); *B29C 47/605* (2013.01); *B29K 2105/0044* (2013.01); *B29C 70/88* (2013.01); *B29C 47/6075* (2013.01); *B29C 47/0016* (2013.01); *B29C 47/625* (2013.01); *B29C 47/6081* (2013.01); *B29K 2105/16* (2013.01); *B29K 2995/003* (2013.01); *B29K 2995/0055* (2013.01); *B29L 2011/0075* (2013.01); *B29C 67/0066* (2013.01); *B29K 2995/0029* (2013.01); *B29C 70/30* (2013.01)

USPC .................. 442/149; 442/2; 442/38; 442/43; 442/45; 442/180; 442/239; 442/295

(58) Field of Classification Search
CPC ...... B32B 17/04; B32B 17/062; B32B 27/04; B32B 1/00; B32B 21/04; B32B 21/042; B32B 21/10; B32B 2260/026; B32B 2419/04; B32B 2451/00; B32B 2607/02
USPC ............. 442/2, 38, 43, 45, 149, 180, 239, 295
See application file for complete search history.

(56) References Cited

U.S. PATENT DOCUMENTS 4,234,907 A * 11/1980 Daniel .......................... 362/556
4,603,252 A * 7/1986 Malek et al. .............. 250/227.14

(Continued)

FOREIGN PATENT DOCUMENTS

DE        3012910 A1   10/1980
DE        69717749 T2  11/2003

(Continued)

OTHER PUBLICATIONS

Translation, DE 3012910A1.

(Continued)

*Primary Examiner* — Andrew Piziali
(74) *Attorney, Agent, or Firm* — Fish & Tsang LLP

(57) ABSTRACT

The invention relates to a translucent composite and a method for producing the translucent composite. The invention includes a plurality of composite materials laid on top of one another and bonded to each other in the region of the bonding surfaces, and includes at least one light transmitting textile, which extends from one side of the composite to the other opposite side of the composite, and is embedded between the bonding surfaces with the composites firmly bonded together.

12 Claims, 6 Drawing Sheets

(56) References Cited

U.S. PATENT DOCUMENTS

| | | | | |
|---|---|---|---|---|
| 4,772,092 | A | * | 9/1988 | Hofer et al. ............... 385/13 |
| 5,390,217 | A | * | 2/1995 | Ioki et al. ............... 376/150 |
| 5,709,448 | A | * | 1/1998 | Jennings et al. ........... 362/581 |
| 7,189,959 | B1 | * | 3/2007 | Morison et al. ......... 250/227.14 |

FOREIGN PATENT DOCUMENTS

| | | | |
|---|---|---|---|
| DE | 102004010920 | A1 | 10/2004 |
| DE | 102005036869 | A1 | 2/2007 |
| DE | 202007000753 | U1 | 5/2007 |
| DE | 102006047475 | A1 | 4/2008 |
| FR | 2 743 135 | | 12/1995 |
| WO | 02/068860 | A1 | 9/2002 |
| WO | 03/097954 | A1 | 11/2003 |
| WO | WO 03/097954 | | 11/2003 |

OTHER PUBLICATIONS

Translation, DE 69717749T2.
Translation, DE 102004010920A1.
Translation, DE 102006047475A1.

* cited by examiner

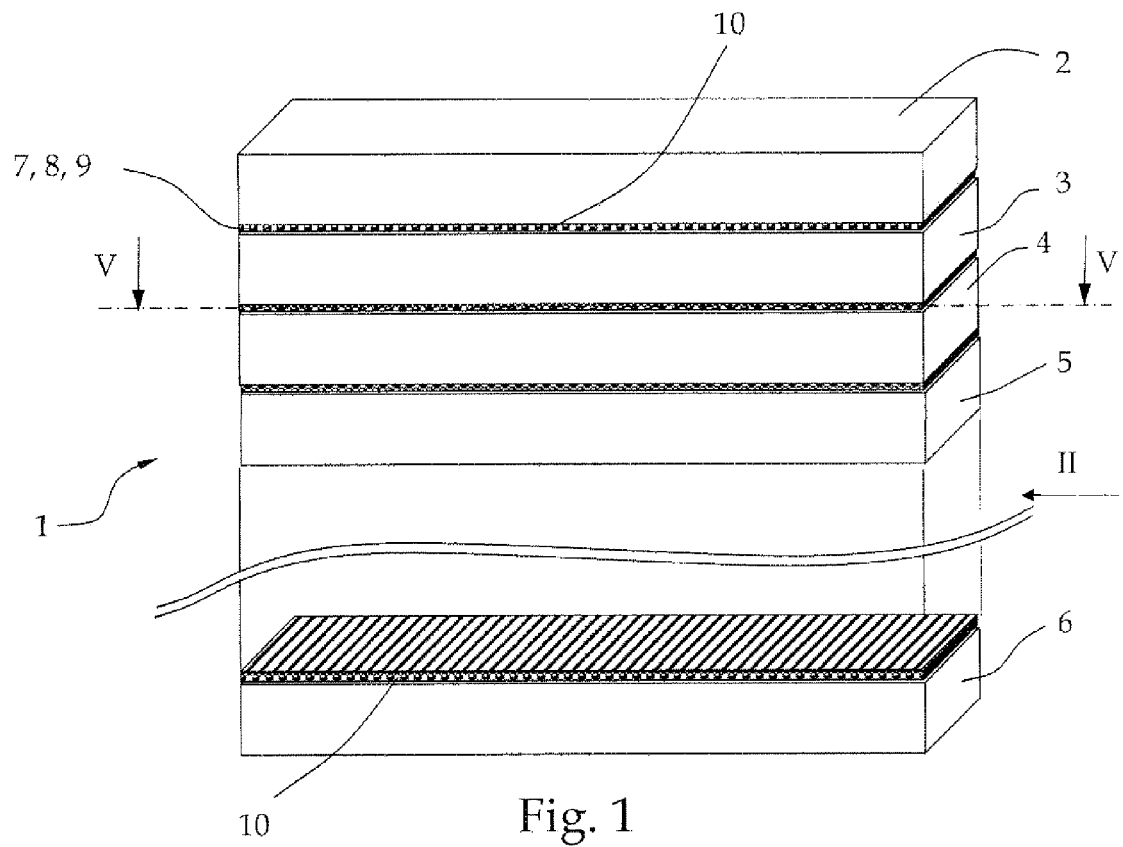
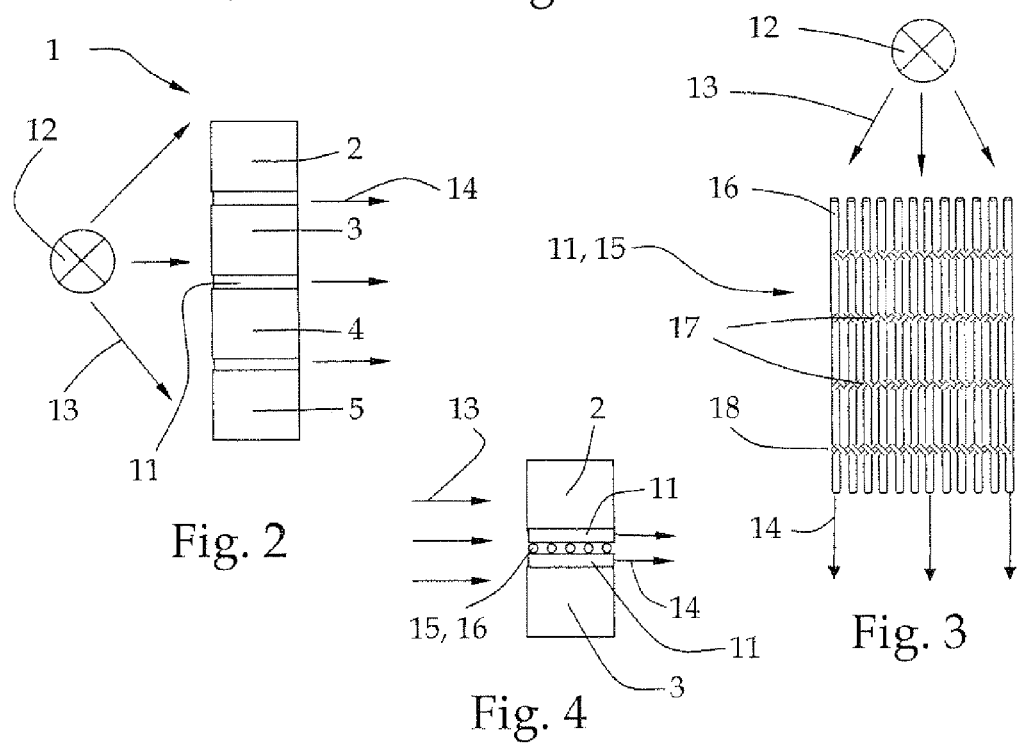
Fig. 1
Fig. 2
Fig. 3
Fig. 4

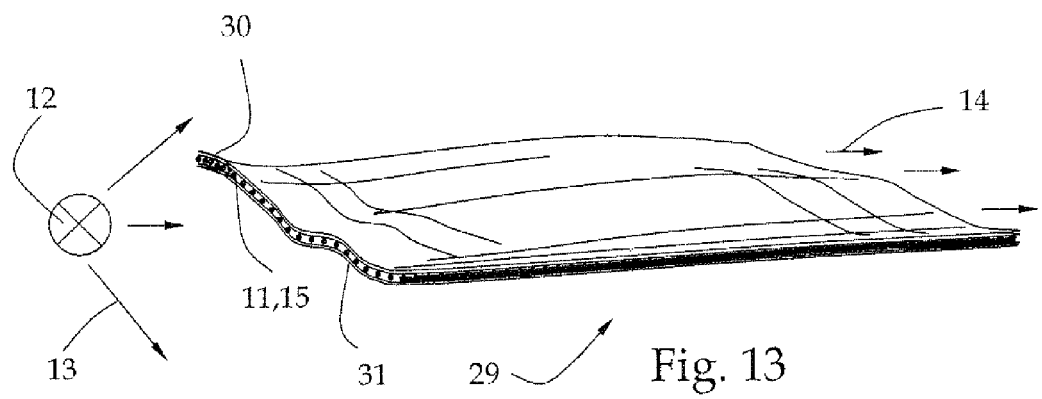
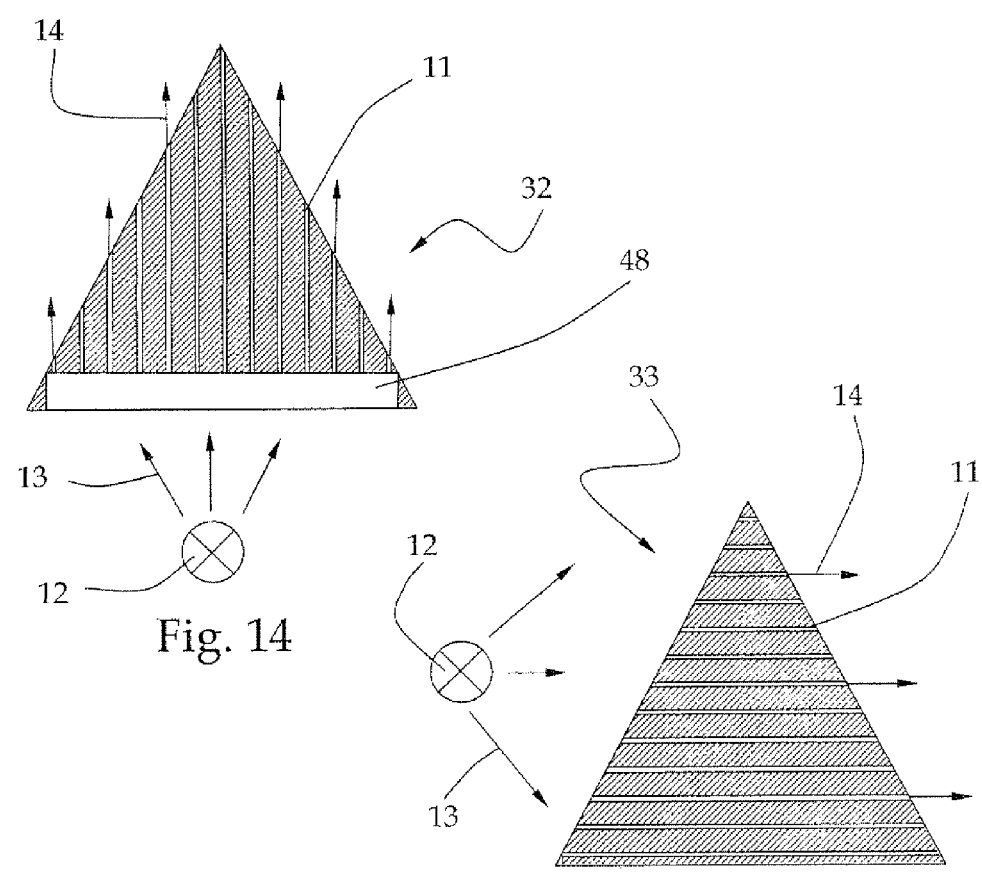

TRANSLUCENT COMPOSITE

FIELD OF THE INVENTION

The subject matter of the invention is related to a translucent composite through which light can be transmitted.

BACKGROUND

With the subject matter of French Patent FR 2 743 135 A1, a composite, which consists of a pourable material, wherein this pourable material is preferably concrete, is disclosed. Such concrete material is poured into a mold and optical fibers, which extend from one side of the mold to the other side, are embedded onto a layer of the not yet hardened concrete. After the optical fibers, which are arranged in parallel, have been embedded, the next layer of concrete is poured. A similar prior art is also disclosed in International Patent WO 03/097954 A1. The disadvantage with such a composite is that after the concrete layers have hardened, a homogenous material results, which is no longer laminated, because the concrete layers flow together and thus a heavy-duty, masonry material is produced which is particularly recommended for the building industry but which is not especially suitable for interior construction, furniture making, textile manufacture or the like. The laminate-type arrangement of the individual layers, which are distinguishable from each other, is lacking.

Therefore an object of the invention is to provide a method and a composite produced with said method so that the composite material is especially suitable for interior construction, furniture making, textile manufacture or the like.

SUMMARY

In order to achieve the object described the invention is characterized by a method according to claim 10 or a plurality of composite material layers laid on top of one another and firmly bonded together, at least one layer containing a light transmitting textile, which extends from one side of the composite to the other opposite side of the composite.

The proposed method offers the substantial advantage that now a composite is made up of layers, distinguishable from each other, which do not flow together and which are physically separate from each other, because they are only joined in the region of their bonding surfaces, and the layer according to the invention made of light transmitting textiles is arranged between two bonding surfaces of adjacent layers.

There are several possible ways to produce such a composite.

In a first embodiment, provision is made for the composite layers to be bonded with one another in the region of their bonding surfaces by a bonding layer. The light transmitting textile arranged in this bonding layer is embedded into the glue of the bonding layer.

The term composite is used in a way that the composite is a relatively large integral building component, which consists of individual composite elements. Below, these composite elements are also called lamellas although the invention is not limited to composites, the individual composite elements of which have the shape of lamellas. This designation is made only in order to provide a simpler description.

Bond of the layers or composite elements may be achieved by glue layers, fusion bonded joints, such as plastic bonding for example, which is formed as plastic adhesive, plastic foam which bonds, or also a two-component plastic adhesive which produces the corresponding adhesive joint between the individual lamellas of the composite.

In addition to fusible joints, which may be in the form of adhesive bonds, the bonding also encompasses mechanical joints, for example a mechanical connection extending through the lamellas in the form of a threaded rod, screw connections, dowel and rivet connections.

In addition to such mechanical connections, clip joints or other mechanical connections, which are able to hold the composite together with the individual lamellas laminated layer by layer on top of one another, are also meant by the general word bonding.

With all embodiments it is important that at least one layer contains light conductors. A light transmitting textile, which is able to absorb the light from one side of the composite and conduct it to the opposite side of the composite, may be laid in the region between two bonding surfaces.

Whenever "lamellas" of a composite are mentioned, the most varied materials can be used for such lamellas. In one embodiment the lamellas are formed from a wood material, from a wood ply material, from a wood composite material or the like. In addition to such wood materials there is even the possibility of producing such lamellas from plastic blocks, metal blocks, in particular metal lamellas, or the like.

In addition, there is the possibility of using very thin lamella-type blocks, which are formed in particular as veneers, especially rotary-cut veneers. These are very thin flexible lamellas, between two opposite bonding surfaces of which the light transmitting textile is embedded.

Such rotary-cut veneers laid on top of one another layer-by-layer are always bonded together by bonding layers between their bonding surfaces and light transmitting textiles are also embedded layer-by-layer exactly into this bonding layer.

The preceding and following descriptions essentially relate to embedding only one layer of light transmitting textiles into each bonding layer. The invention, however, is not limited to this. As many layers of light transmitting textiles as desired can be embedded lying on top of one another and thus form a body of the bonding layer between the individual lamellas.

In a particular embodiment, the light transmitting textiles is embedded cross-wise so that the light conductors of one light transmitting textile conduct the light in one direction through the bonding layer while the further layer of light transmitting textiles, laid cross-wise thereon, has arranged the light conductors in such a way that these conduct the light across the bonding layer in a direction perpendicular to the light conductors first mentioned.

Thus, random layers, which are also randomly oriented, of light transmitting textiles can be embedded into the connecting layer between the individual lamellas.

In this way laminated boards, which are especially suitable for furniture making, can be produced. Such laminated boards can be formed as table tops, furniture tops, wall cladding, steps of staircases, kitchen worktops, hand rails of staircases or the like.

With all embodiments the surprising luminous effect, which results in the case of such a composite, is fascinating. Depending on the thickness of the lamellas used, a light passage, which is usually in the shape of a narrow strip, forms between the lamellas. These strips then illuminate—possibly also in different colors—and lend the composite produced in this way a fascinating luminescence.

In order to achieve the object, such a composite does not have to be formed as a laminated board, that is to say, it does not have to be a straight, even board. These laminated boards can be produced with arbitrary spherical curves. They can also have recesses, wherein corresponding light sources, which illuminate outwards from the interior of the laminated board, are arranged.

Besides the aforementioned materials, which were described for selecting the material of the lamella, there is also the possibility of producing such lamellas from a natural stone or composite stone, sawn composite stone or natural stone lamellas preferably being used. These can also be laid layer by layer on top of one another and the light transmitting textiles mentioned above can be embedded into the bonding layer between the individual stone lamellas.

The term light transmitting textile generally refer to a light transmitting mat, which is formed by providing optical fibers, held parallel and at an equal distance to each other, which are bound together in the form of a woven fabric. In this case, there are single-layer optical fibers, which form the only light transmitting plane, and there are also multi-layer optical fibers, which form a plurality of layers of light transmitting planes lying on top of one another. This structure may consist of a woven fabric, which means that such a woven fabric has for example warp, weft and fringe yarns. Likewise, knitted or crocheted textiles can be used in place of the woven fabric.

In another embodiment, provision can be made for such a light transmitting textile to provide light conductors aligned perpendicularly to each other directly in the woven fabric. Further, a woven fabric having light conductors oriented in one direction only could be provided as a first layer, and a further layer with light conductors oriented in the direction perpendicular to the light conductors of the first layer may be laid thereon.

The lamellas do not necessarily have to be formed as a rectangle. They can have also any arbitrary profiles such as for example: oval profile, round profile, hexagonal profile, triangular or other profiles. It is only important that the light transmitting textiles mentioned above are arranged between the bonding surfaces of the individual lamellas and thus form part of a superficial bonding layer.

In a composite the lamella profiles may be annular rings, triangular rings, oval rings and the like. Bonding layers, into which the light transmitting textile is embedded, are arranged between these annular elements or generally the lamella profiles. Also with such formed composites, the bonding layer can consist of a paste or glue layer, but the individual lamellas can also be connected together mechanically or in a different way.

Such composites can be hollowed out from the inside, in order to implant a light source in the interior, so that these composites illuminate from the inside outwards and in particular form lamps, directional signs or other luminescent decorative blocks.

In particular it is also possible to use such a luminescent composite, whether as laminated board or as arbitrary formed composites, as a projection surface. The light source is then, for example, a digital projector, which emits corresponding light signals onto one light-absorbing layer of the composite, which light signals are conducted through the composite to the other side. In this way, the composite can be formed as a projection surface and visible surface. Such effects appear particularly advantageous if such a composite is formed as a facade panel, for example, and the light-emitting projector is arranged on the inside of the building and the exterior of such a luminescent facade panel is visible from the outside.

Moreover, provision can be also made for such a luminescent facade panel to be thermally insulated. It is therefore possible to join together two such laminated boards with an intermediate translucent insulating layer and the light source is then arranged on one side of the laminated board and emits its light through the first laminated board, this light then being conducted into the intermediate insulating layer and from there into the second laminated board. Thus, thermally insulated facade panels can also be produced in this way.

Further, a composite may be produced from textile materials. In the simplest case this is a method in which the light transmitting textiles previously mentioned are embedded between two carpet-like textiles, which in turn are embedded as a single layer or multi-layer, oriented to one side or crosswise and such a textile planar structure absorbs the light from one side and the optical fibers transmit the light to the connecting layer between the two textile layers and conduct it to the opposite side. Such textile composites can then be shaped in arbitrary planes and can be formed as wall hangings, wallpaper and the like.

A method for producing a laminated board comprises removing a sheet, which is provided in its surface with a glue layer, from a stack of sheets. In the second process step a non-woven fabric or fabric made of a light transmitting textile, which for example is unwound from a roller and evenly pressed into the glue layer on the upper face of the board, is embedded into this glue layer.

As the third process step, the next sheet of the stack of sheets is laid, resulting in an adhesive bond formed between the sheet first mentioned and the second sheet. As the next step the previous method is repeated, wherein in turn a glue layer is applied from the front onto the sheet already laid, into which subsequently again a woven fabric is embedded and then again the next sheet is laid thereon. In the next process step the composite block produced in this way is sawn with a frame saw, creating individual laminated wooden tops, again consisting of the lamellas mentioned above, which are now firmly bonded together by means of said adhesive joints, the light transmitting textiles mentioned above always being arranged in the connecting region.

In the last process step the entire laminated, preferrably wooden, top is smoothed on the upper face and possibly also on the lower face, in order to form a particularly attractive surface.

It is important that such a laminated wooden top can be produced from any furniture-making material, but in addition from veneers and the like.

Of course, the laminated board produced in this way can be surface-treated, for example, by painting, polishing, oiling, waxing, brushing and the like. This results in attractive decorative boards, which are translucent, on whose visible surface the light transmitting textiles can only be seen from the front, so that thin narrow strips result from the visible side, which illuminate, while the front sides of the lamellas held together can be seen between the strips.

Such decorative boards can also be used particularly in the automotive industry for the interior trim of motor vehicles and the like.

IN THE DRAWINGS

The invention is described below in detail on the basis of several drawings illustrating several embodiment. In this case further substantial features and advantages of the invention will become clear from the drawings and their description, wherein:

FIG. 1 shows a section with a partial perspective illustration of a first embodiment of a laminated board.

FIG. 2 is a plan view onto the face of the laminated board according to FIG. 1 in the direction of the arrow 11.

FIG. 3 is a plan view onto a light transmitting textile.

FIG. 4 shows an embodiment with two light transmitting textiles laid perpendicularly to each other modified in relation to FIG. 2.

FIG. 11 shows an exemplary embodiment modified in relation to FIG. 10 with two laminated boards and a translucent insulating layer lying in between.

FIG. 13 is an illustration of a textile composite top.

FIG. 14 shows a first embodiment of a composite in the form of a pyramid.

FIG. 15 shows a second embodiment of a composite in the form of a pyramid.

DETAILED DESCRIPTION

Figure 5:
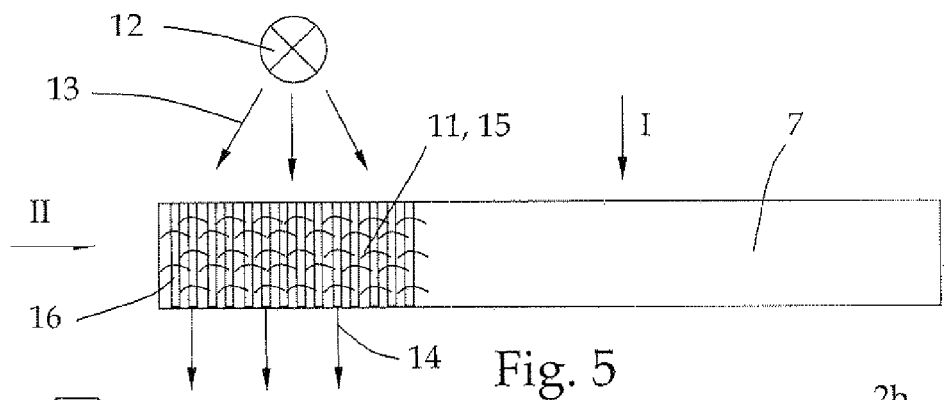
FIG. 5 shows a section along line V-V in FIG. 1.

In FIG. 1 a laminated board 1 which consists of individual lamellas 2-6 is illustrated. The lamellas 2-6 can consist of one out of a plurality of materials. By way of example, the following description relates to wood as the composite material.

The lamellas 2-6 are laid on top of one another in the region of their respective bonding surfaces 7 and a layer of light transmitting textile 11 is embedded between the two bonding surfaces 7. Thus a butt joint 8 results in the region of the bonding surfaces 7 between the lamellas 2-6 and in the region of this butt joint 8 a bonding layer 9 is now formed. The bonding layer is, for example, of a glue layer 10 which on the one hand binds the light transmitting textiles 11 and on the other hand also bonds the bonding surfaces 7 of the individual adjacent lamellas 2-6 associated with one another.

Instead of bonding by means of the glue layer 10, other fusible joints can also be selected, for example gluing with plastic adhesive and the like.

It is important that in accordance with FIG. 2 a laminated board 1 produced in this way can be illuminated from one side with a light source 12, which emits the light rays in the arrow direction 13 onto one side of the laminated board 1 and that the light conductors 16 embedded into the light transmitting textiles 11 absorb the light from the front side and in the arrow direction 14 conduct it to the opposite side (visible side) of the laminated board 1.

In FIG. 3 it is diagrammatically shown how the light transmitting textile 11 is formed as a woven fabric and in this case a row of warp and weft yarns 17 is illustrated, where additional fringe yarns 18 are present.

FIG. 4 as a modified exemplary embodiment compared to FIG. 2 shows that the light transmitting textiles 11, 15 can also be laid crosswise on top of one another and in this case form two layers. On one layer of the light transmitting textile 11 a second layer of a light transmitting textile 15 is laid, wherein respective light conductors 16 run perpendicularly to each other, so that the light is conducted to both the opposite side of the laminated board as well as to the respective front faces of the laminated board.

FIG. 5 shows a section through the bonding layer 9 between the individual lamellas 2-6, where it can be seen how the respective light transmitting textile 11 is embedded and conducts the light from one side to the other side.

Figure 6:
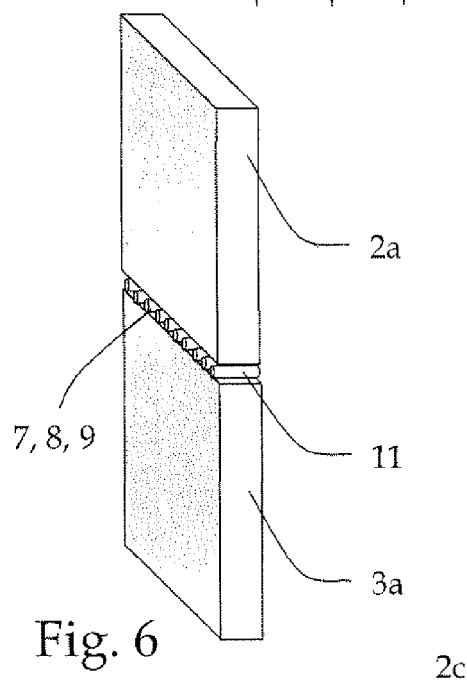
FIG. 6 shows an exemplary embodiment modified in relation to FIG. 1, wherein the lamellas stand upright and in this case the light transmitting textile is embedded in the connecting region.

FIG. 6 shows that the lamellas can be laid on top of one another not only lying flat, but also standing upright. This is illustrated on the basis of the lamellas 2a and 3a in FIG. 6.

Figure 7:
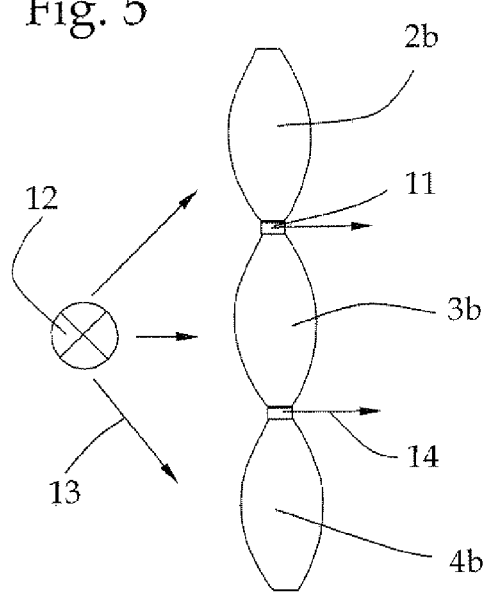
FIG. 7 shows an exemplary embodiment modified in relation to FIG. 6 with differently formed lamellas.
Figure 8:
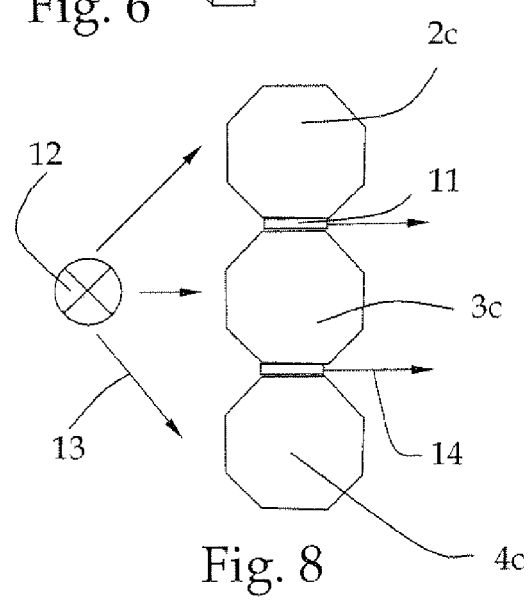
FIG. 8 shows an exemplary embodiment modified in relation to FIG. 7.
Figure 9:
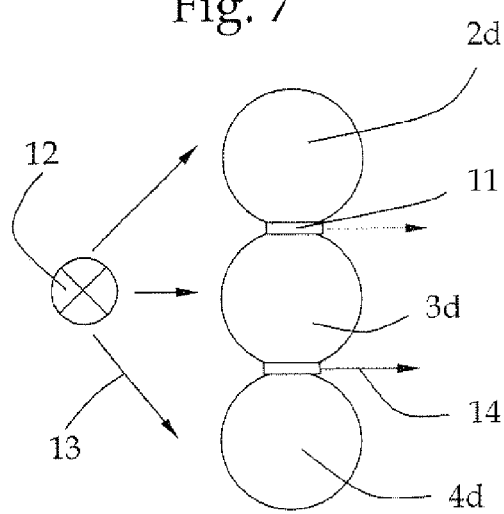
FIG. 9 shows an exemplary embodiment modified in relation to FIG. 8.

FIGS. 7 to 9 show that such lamellas can also have different profiles. FIG. 7 shows semi-circular or oval lamellas 2b, 3b, 4b, while FIG. 8 shows hexagonal lamellas 2c, 3c, 4c and FIG. 9 shows round lamellas 2d, 3d, 4d.

Moreover, in order to achieve the object all lamellas 2, 2a, 2b, 2c, 2d do not have to be laid in one plane. Such a laminated board 1 can also have curves, edges, corners, protrusions or any desired shape.

For this reason the lamellas 2-6 also do not have to be formed as rectangular blocks, but they can also be curved blocks, corrugated blocks or even blocks with undercuts, drilled holes and incisions.

Figure 10:
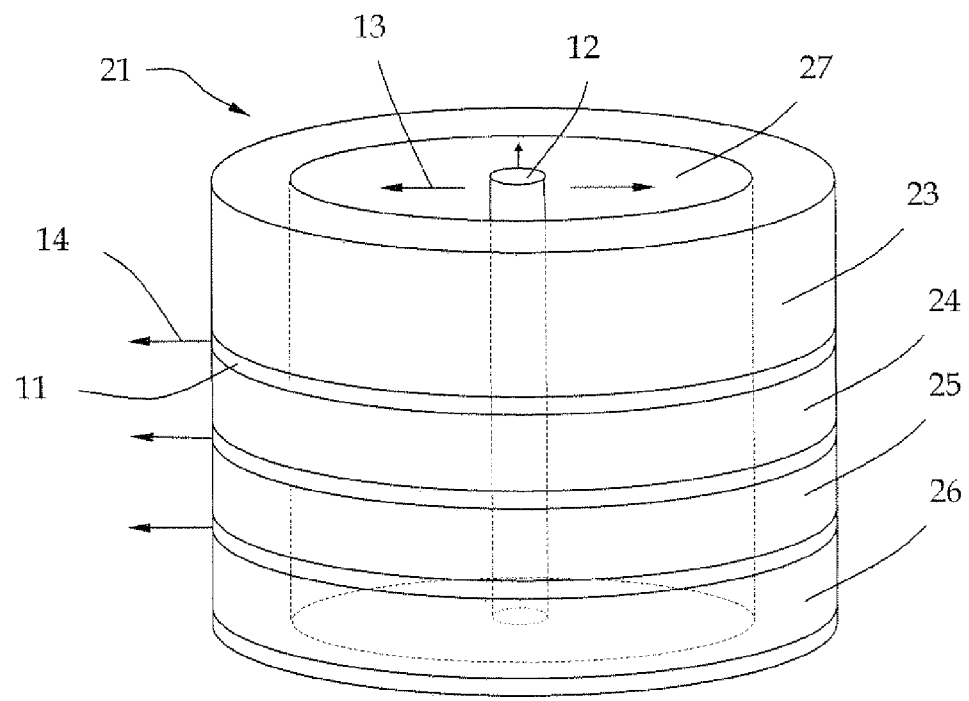
FIG. 10 shows a further exemplary embodiment for producing a composite from round lamellas.

FIG. 10 shows a further exemplary embodiment of a composite 21, which consists of teether-shaped rings, which are designated below as lamella rings 22-26. These are laid on top of one another in the same way as described above and bonded together by means of any suitable joining methods, as a result of which one or more light transmitting textiles 11, 15 are embedded in the region of the bonding layers.

The entire composite 21 can have an internal recess 27 and, arranged in this recess, a light source 12, which conducts the light into the composite 21 in the arrow direction 13 from the inside outwards, so that its outer circumference illuminates in an attractive way.

Of course, the invention is not at all limited in type or form of the light source 12. The light source can be a halogen light source, an incandescent bulb, an EL foil, a fluorescent tube or the like.

Figure 11:
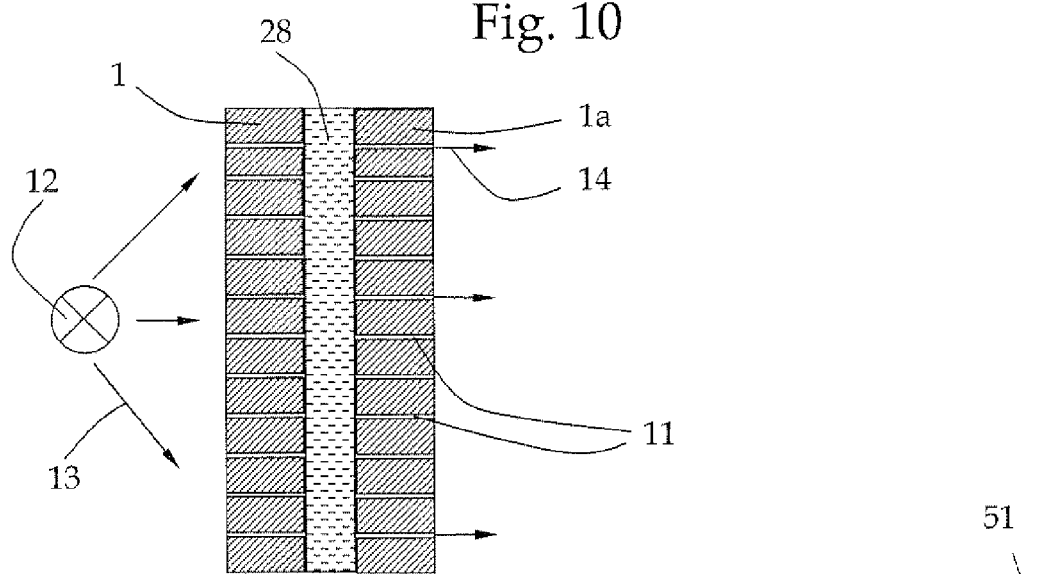

FIG. 11 shows a further composite, which is designed as a thermally insulated facade panel. Two laminated boards 1, 1a, which can be formed in the way described above according to FIGS. 1 to 10, are provided and these two laminated boards 1, 1a are again joined with an insulating layer 28 in between them, said insulating layer being translucent. This insulating layer is consists of a translucent plastic which can be provided as a PMMA composite and which forms either transparent plastic layers or translucent plastic films.

Figure 12:
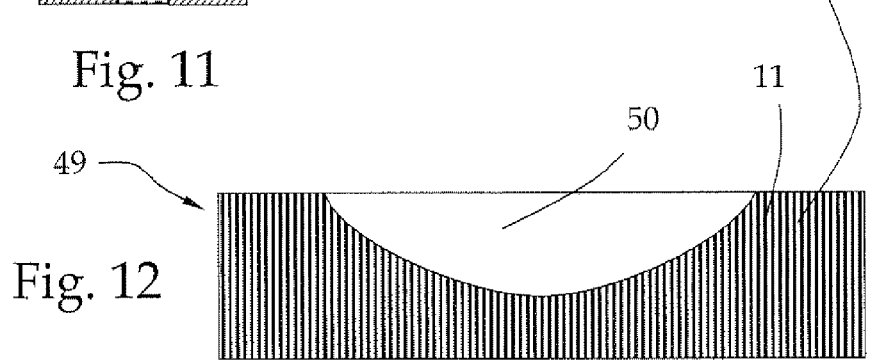
FIG. 12 is a diagrammatically illustrated section through a composite, which is formed, for example, as a washbasin or washstand.
Figure 16:
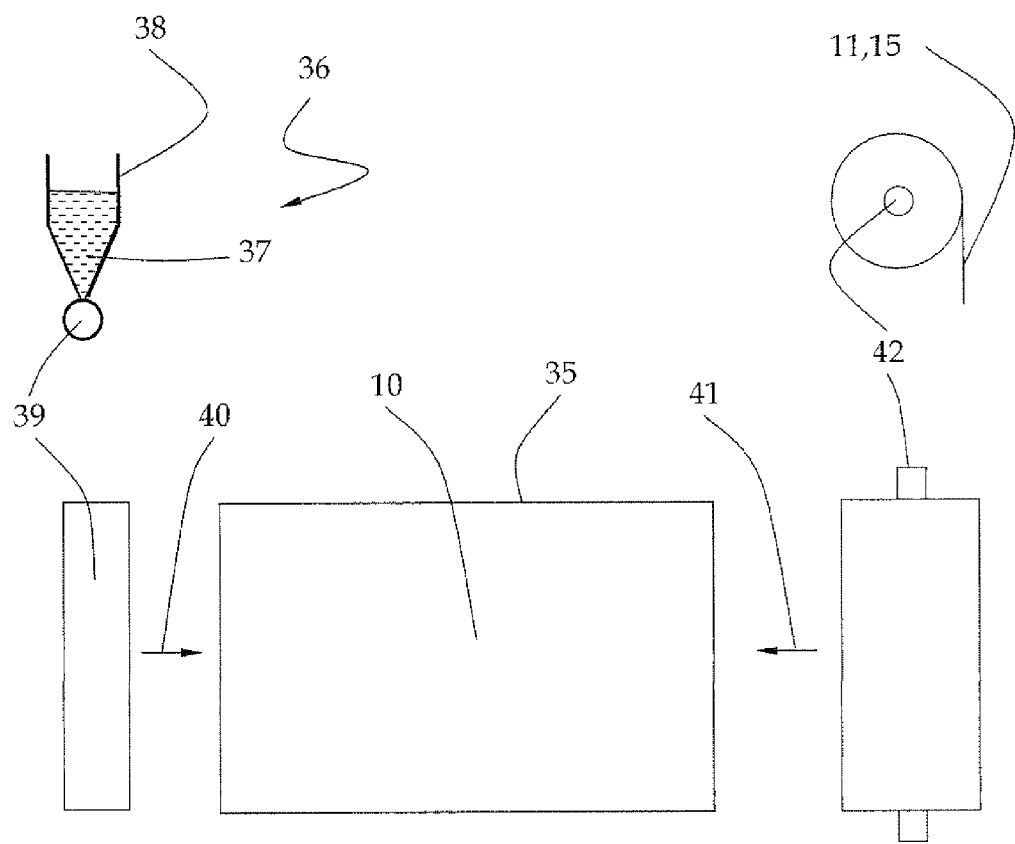
FIG. 16 shows a side illustration of a first process step for executing the method.

FIG. 12 shows a washstand 49, which is formed in the manner of the laminated board 1, as a further exemplary embodiment, the laminated board being cut out from above to produce the washstand 49, as a result of which a washbasin 50 results. The individual light transmitting layers with the light transmitting textiles 11 here are arranged vertically from the bottom to the top, and if a light source is placed under the washstand 49 with the individual bonded laminated boards 51, a particularly aesthetically impressive appearance can result from the upper side.

FIG. 13 shows a textile table top 29, which is formed from individual textile layers 30, 31 laid on top of one another, as a further exemplary embodiment, one or more light transmitting textiles 11, 15 again being embedded in the gap between the textile layers 30, 31. If one front face of the textile table top 29 is illuminated with the light source 12, the light is conducted to the opposite front face.

FIGS. 14 and 15 show further composites 32, 33 wherein alternatively the individual light transmitting layers with the light transmitting textiles are aligned vertically from the top to the bottom or even crosswise. In FIG. 14 the light source 12 may be provided in the region of a recess 48, so that the composite 32 is fully closed and its interior bears a light source 12, which illuminates the entire lower front face.

Through the triangular form of the exterior surface of the composite—which is shaped as a pyramid for example—a particularly impressive illuminating effect results, because depending on the length of the light transmitting fibers a different illuminating effect appears on the exterior surface.

The same also applies to the composite 33 according to FIG. 15, which is laminated in a different way. While the composite 32 is laminated in the vertical direction, the composite 33 according to FIG. 15 is laminated in the horizontal direction.

FIGS. 16 to 19 show a method for producing a laminated board. The other composites described herein are produced in a similar way. Therefore, it suffices only to describe the production of a laminated board 1 in detail.

As a first process step, a stack of sheets 34, which consists of individual sheets 35 laid on top of one another, is formed. Each sheet can for example be 200×300 cm in size.

Figure 17:
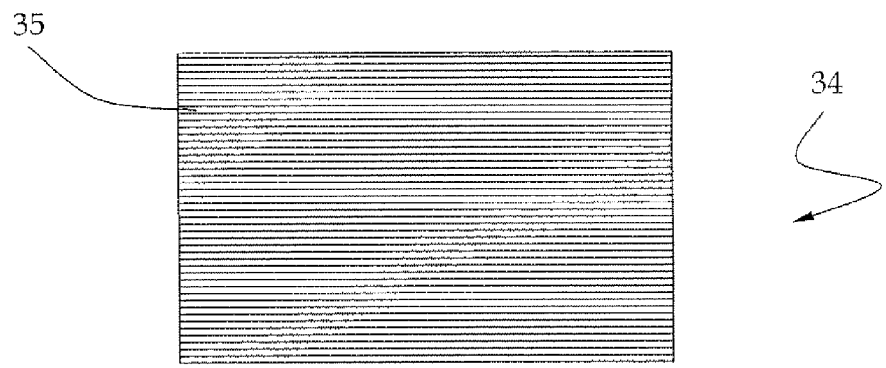
FIG. 17 shows further steps of the method for producing a laminated board.

As the next process step, a first sheet 35 is removed from the stack of sheets 34 and a glue layer is applied onto the surface—see FIG. 17. For this purpose a gluing device 36 is provided which consists of a glue container 38 which is filled with suitable glue 37. This glue 37 is coated onto an application roller 39 which is moved in the arrow direction 40 over the surface of the sheet 35 in order to form the glue layer 10 in this way.

Instead of applying the glue 37 with an application roller 39 other application methods are possible, such as for example a spray application, application with a blade and the like.

As the next process step, the glass fiber fabric with light transmitting textile 11, 15, wound on a roller 42, is guided in the arrow direction 41 across the surface of the sheet 35 in order to lay and embed the light transmitting textile into the glue layer 10. In the next process step the next sheet 35 is taken from the stack of sheets 34 and laid on the sheet mentioned previously as a result of which an adhesive bond develops between the sheets lying on top of one another with the light transmitting textile 11, 15 lying in between.

Figure 18:
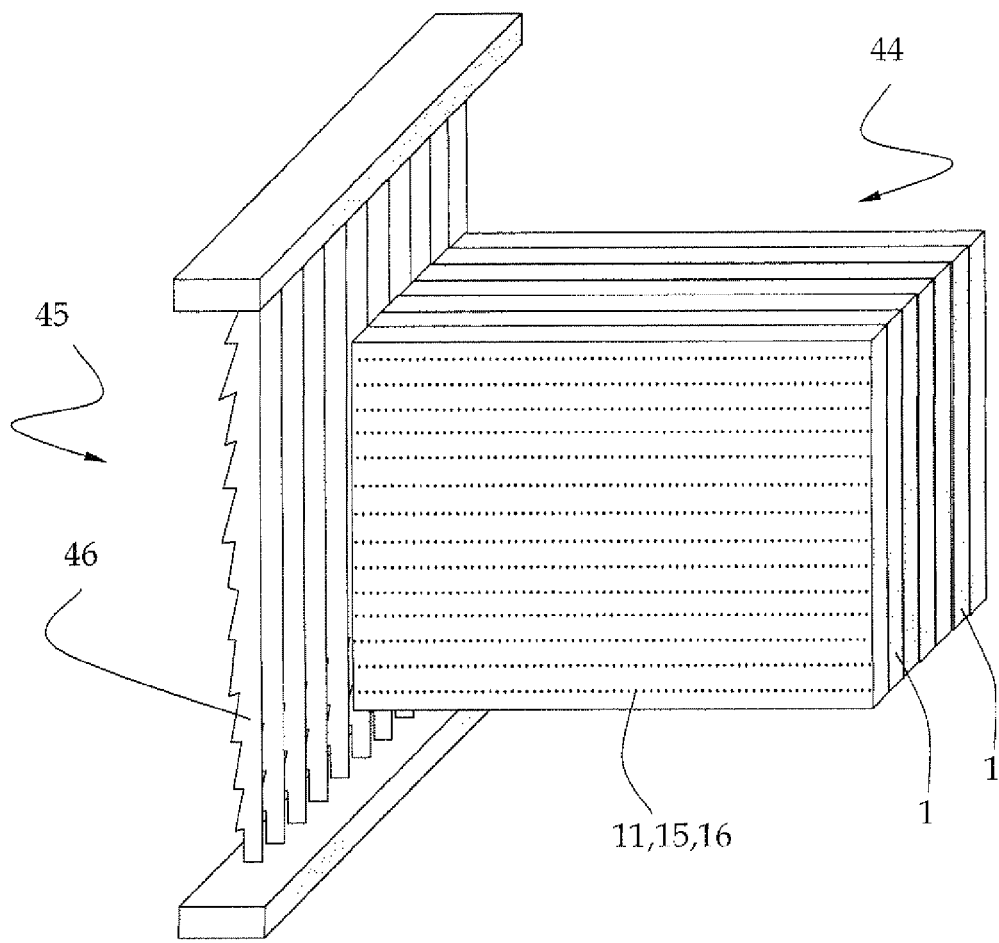
FIG. 18 shows further processing of the composite block produced by the method.
Figure 19:
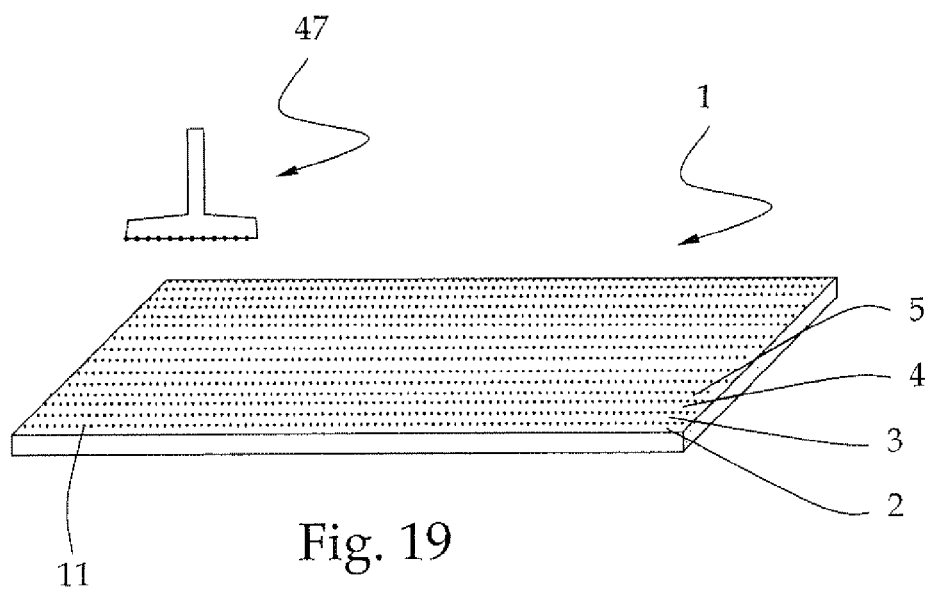
FIG. 19 shows a laminated board produced from the composite block.

Finally, after a number of successive process steps adding more sheets and bonding layers, a composite block 44 illustrated in FIG. 18, which incorporates a plurality of light transmitting bonding layers, is created. By means of a frame saw 45 and with a number of saw blades 46 arranged in parallel and at an equal distance from each other, the composite block 44 is cut up in order to produce a laminated wooden top as illustrated in FIG. 1 and FIG. 19. It then consists, as illustrated, of individual lamellas 2-6 glued together layer by layer between which the light transmitting textiles 15 are arranged.

In the last process step, the upper face and possibly also the lower face is smoothed by means of a grinder 47.

In this way an aesthetically attractive laminated board, which can be made from any arbitrary materials, is produced. It goes without saying that the production method described in the processes according to FIGS. 16 to 19 can also be developed as a continuous production process, wherein gluing, application of the light transmitting textiles, etc. take place in successive process steps, which follow one after the other.

LEGEND FOR DRAWING

1 Laminated board Ia
2 Lamella
3 Lamella
4 Lamella
5 Lamella
6 Lamella
7 Bonding surface
8 Butt joint
9 Bonding layer
10 Glue layer
11 Light transmitting textile
12 Light source
13 Arrow direction
14 Arrow direction
15 Light transmitting textile
16 Light conductor
17 Warp and weft yarns
18 Fringe yarns
21 Composite
22 Lamella ring
26 Lamella ring
27 Recess
28 Insulating layer
29 Textile table top
30 Textile layer
31 Textile layer
32 Composite
33 Composite
34 Stack of sheets
35 Sheet
36 Gluing device
37 Glue
38 Glue container
39 Application roller
40 Arrow direction
41 Arrow direction
42 Roller
43 Laying roller
44 Composite block
45 Frame saw
46 Saw blade
47 Grinder
48 Recess
49 Washstand
50 Washbasin
51 Laminated board

The invention claimed is:

1. An apparatus suitable for interior construction or furniture making, comprising:

a plurality of composite layers bonded to each other to thereby form a composite having first and second opposing sides, the composite further having a width, a length, and a thickness that extends between the first and second sides;

wherein each of the composite layers comprises a first sub-layer and a second sub-layer;

wherein the first sub-layer comprises at least one of a wood material, a wood ply material, a wood composite, a natural stone, and a composite stone, and wherein the second sub-layer comprises a light-transmitting textile embedded in a bonding material;

wherein the light transmitting textile comprises a plurality of optical fibers, and wherein a first of the composite layers is coupled to a second of the composite layers such that at least part of the second sub-layer in the first of the composite layers binds to at least part of the first sub-layer of the second composite layer;

wherein the length of the composite extends in a direction of a length of at least one of the plurality of composite layers, wherein the width of the composite extends in a direction of a number of the plurality of composite layers;

wherein the plurality of optical fibers are disposed in the composite such that the plurality of optical fibers extend across the thickness of the composite from the first side to the second side; and wherein the length and the width are greater than the thickness.

2. The apparatus according to claim 1, wherein the apparatus is configured as at least one of the following: a table top, a furniture top, a wall cladding, a step or a staircase, a kitchen worktop, a handrail, a wallpaper, and a wall hanging.

3. The apparatus according to claim 1, wherein the light transmitting textile of the first composite layer has a plurality of void spaces between the plurality of optical fibers, and wherein the bonding material is disposed in the void spaces.

4. The apparatus according to claim 1, wherein the second sub-layer comprises a second light transmitting textile with a second plurality of optical fibers, and optionally, wherein first and second pluralities of optical fibers are perpendicularly oriented relative to each other.

5. The apparatus according to claim 1, wherein the light transmitting textile of the first composite layer is formed as woven fabric and has a row of warp and weft yarns with additional fringe yarns.

6. The apparatus according to claim 1, wherein the bonding material is an adhesive.

7. The apparatus according to claim 1, having a curved shape.

8. The apparatus according to claim 1, having a shape that includes an internal recess that is configured to receive a light source and that is further configured to allow emission of light from the recess to an outside surface of the material.

9. The apparatus according to claim 1 further comprising a translucent insulating layer that is coupled to the apparatus.

10. The apparatus according to claim 9 further comprising a second apparatus, wherein the translucent insulating layer is disposed between the second apparatus and the apparatus according to claim 1.

11. The apparatus according to claim 1, wherein the plurality of composite layers comprise at least 10 layers.

12. The apparatus according to claim 1, wherein the apparatus is configured as at least one of a lamp, a directional sign, and a luminescent decorative block.

* * * * *